United States Patent [19]

Abe et al.

[11] Patent Number: 5,635,570

[45] Date of Patent: Jun. 3, 1997

[54] RESIN COMPOSITION AND PROCESS FOR PRODUCING THE SAME

[75] Inventors: Hiroomi Abe, Chiba; Kenji Nagaoka; Takashi Sanada, both of Ichihara, all of Japan

[73] Assignee: Sumitomo Chemical Company, Limited, Osaka, Japan

[21] Appl. No.: 290,517

[22] Filed: Aug. 15, 1994

Related U.S. Application Data

[63] Continuation of Ser. No. 95,490, Jul. 22, 1993, abandoned, which is a continuation of Ser. No. 744,495, Aug. 14, 1991, abandoned.

[30] Foreign Application Priority Data

Aug. 23, 1990 [JP] Japan ...................... 2-224054

[51] Int. Cl.$^6$ ................ C08F 283/08; C08L 81/04
[52] U.S. Cl. ........................... 525/391; 525/537
[58] Field of Search ..................... 525/391, 537

[56] References Cited

U.S. PATENT DOCUMENTS

| | | | |
|---|---|---|---|
| 4,021,596 | 5/1977 | Bailey | 525/390 |
| 4,929,665 | 5/1990 | Inoue et al. | 525/391 |
| 5,017,652 | 5/1991 | Abe et al. | 525/390 |
| 5,026,764 | 6/1991 | Okabe et al. | 524/540 |
| 5,028,656 | 7/1991 | Okabe et al. | 524/540 |
| 5,070,151 | 12/1991 | Mizuno et al. | 525/397 |
| 5,102,591 | 4/1992 | Hasson et al. | 264/45.9 |
| 5,122,578 | 6/1992 | Han et al. | 525/537 |
| 5,214,083 | 5/1993 | Kodaira et al. | 524/95 |

FOREIGN PATENT DOCUMENTS

| | | |
|---|---|---|
| 0262901 | 4/1988 | European Pat. Off. . |
| 0341422 | 11/1989 | European Pat. Off. . |
| 1266160 | 10/1989 | Japan . |

*Primary Examiner*—Helen Lee
*Attorney, Agent, or Firm*—Watson Cole Stevens Davis, P.L.L.C.

[57] ABSTRACT

A resin composition prepared by simultaneously melting and kneading (A) a polyphenylene ether resin, (B) a polyarylene sulfide resin and (C) a functional compound having a bond or a functional group selected from the group consisting of non-aromatic carbon-carbon multiple bond, oxirane group and derived-carboxyl group and subsequently mixing thereinto (D) a polar compound having, in on molecule, at least two polar groups selected from the group consisting of derived-carboxyl group, derived-hydroxyl group, derived-amino group, derived-mercapto group, derived-sulfonic acid group, oxazoline group, cyanamide group, isocyanate group and oxirane group, provided that at least one of the polar groups is different from at least one of the functional groups which the functional compound (C) has.

2 Claims, No Drawings

RESIN COMPOSITION AND PROCESS FOR PRODUCING THE SAME

This application is a continuation of application Ser. No. 08/095,490, filed Jul. 22, 1993, now abandoned, which in turn is a continuation of application Ser. No. 07/744,495, filed Aug. 14, 1991, now abandoned.

BACKGROUND OF THE INVENTION

1. Field of the Invention

This invention relates to a resin composition, and more particularly to a thermoplastic resin composition excellent in impact resistance comprising a polyphenylene ether resin and a polyarylene sulfide resin as its main constituent resin components.

2. Related Art

Although polyphenylene ether resin has excellent mechanical and electrical properties and a high heat resistance, it has a fault that it is inferior in moldability and solvent resistance. Accordingly, polyphenylene ether resin itself is greatly restricted in utilizability at the present time.

On the other hand, polyarylene sulfide resin exemplified by polyphenylene sulfide resin is one of the resins classified as heat-resistant resins. It is characterized by high continuous use temperature and high stiffness, and further by high melt fluidity, flame retardancy and excellent solvent resistance. Thus, it is widely used practically as molded articles and films. However, polyarylene sulfide resin has a fault that it is low in mechanical strengths and particularly in impact strength. This fault obstructs a further expansion of its use.

Under such a situation, it is industrially valuable to provide a resin composition simultaneously having the merits of polyphenylene ether resin and polyarylene sulfide resin, each having respective excellent characteristic feature, by blending them together, and a proposal has already been made for it (JP-B-56-34032). However, polyphenylene ether resin and polyarylene sulfide resin are generally poor in mutual affinity, and it is difficult at the present stage to obtain a resin composition of excellent mechanical properties by merely blending them.

In order to overcome such disadvantages, there have been proposed various resin compositions such as a resin composition comprising a polyphenylene ether resin, polyphenylene sulfide and an epoxy resin (JP-B-60-11063), a resin composition comprising a modified polyphenylene ether resin and polyphenylene sulfide (JP-A-64-36645), a resin composition comprising a modified polyphenylene ether resin, a modified polyphenylene sulfide and a binder (JP-A-1-266160), a resin composition comprising a modified polyphenylene ether resin, polyphenylene sulfide and a polyisocyanate compound (JP-A-2-49023), etc.

None of these compositions hitherto proposed, however, is satisfactory in impact resistance, though they are improved in solvent resistance and moldability.

The object of this invention is to provide a resin composition excellent in mechanical properties and particularly in impact strength which comprises, as its main resin constituents, a polyphenylene ether resin characterized by its excellent heat resistance and mechanical properties and a polyarylene sulfide resin characterized by its excellent solvent resistance, stiffness and melt fluidity.

With the aim of achieving the above-mentioned object, the present inventors conducted elaborated studies to find that, if a polyphenylene ether resin, a polyarylene sulfide resin and two or more kinds of specified organic compounds are melted and kneaded by a specified method, there can be obtained, surprisingly, a resin composition of which dispersion state is better and of which impact strength is much superior as compared with resin compositions prepared by melting and kneading these ingredients by other methods. Based on the finding, this invention was accomplished.

The resin composition of this invention thus obtained makes the best of its excellent impact strength and economicity and can be formed by various molding processes such as extrusion molding, injection molding, blow molding, etc., and thereby they can be supplied to the society as a variety of useful resin articles. Thus, this invention has a very high industrial value.

SUMMARY OF THE INVENTION

Thus, this invention provides a resin composition prepared by simultaneously melting and kneading (A) polyphenylene ether resin, (B) polyarylene sulfide resin and (C) a functional compound having a bond or a functional group selected from the group consisting of non-aromatic carbon-carbon multiple bond, oxirane group and derived-carboxyl group, followed by mixing thereinto (D) a polar compound having in one molecule two or more polar groups selected from the group consisting of derived-carboxyl group, derived-hydroxyl group, derived-amino group, derived-mercapto group, derived-sulfonic acid group, oxazoline group, cyanamide group, isocyanate group and oxirane group, provided that at least one of said polar groups is different from at least one of the functional groups which the functional compound (C) has, and a process for producing a resin composition which comprises simultaneously melting and kneading (A) polyphenylene ether resin, (B) polyarylene sulfide resin and (C) a functional compound having a bond or a functional group selected from the group consisting of non-aromatic carbon-carbon multiple bond, oxirane group and derived-carboxyl group, followed by mixing thereinto (D) a polar compound having in one molecule two or more polar groups selected from the group consisting of derived-carboxyl group, derived-hydroxyl group, derived-amino group, derived-mercapto group, derived-sulfonic acid group, oxazoline group, cyanamide group, isocyanate group and oxirane group, provided that at least one of said polar groups is different from at least one of the functional groups which the functional compound (C) has.

DESCRIPTION OF THE PREFERRED EMBODIMENTS

In this invention, the term "polyphenylene ether resin (A)" means a polymer constituted of a recurring unit represented by the following general formula (1):

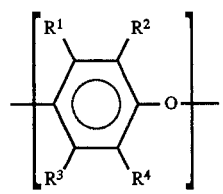

wherein $R_1$, $R_2$, $R_3$ and $R^4$ each represents identical or different group selected from the group consisting of hydrogen atom, halogen atom, hydrocarbon group, substituted hydrocarbon group, hydrocarbon-oxy group and substituted hydrocarbon-oxy group. As examples of the substituent in the substituted hydrocarbon group and substituted hydrocarbon-oxy group, thermally stable groups such as halogen atom, hydroxyl group, amino group, nitro group, cyano group, carboxyl group, amido group, ether group, sulfide group, sulfone group and the like can be referred to.

Concrete examples of the polyphenylene ether resin represented by general formula (1) include the followings:

poly(2,6-dimethyl-1,4-phenylene ether),
poly(2,6-diethyl-1,4-phenylene ether),
poly(2-methyl-6-ethyl-1,4-phenylene ether),
poly(2-methyl-6-propyl-1,4-phenylene ether),
poly(2,6-dipropyl-1,4-phenylene ether),
poly(2-ethyl-6-propyl-1,4-phenylene ether),
poly(2,6-dibutyl-1,4-phenylene ether),
poly(2,6-dipropenyl-1,4-phenylene ether),
poly(2,6-dilauryl-1,4-phenylene ether),
poly(2,6-diphenyl-1,4-phenylene ether),
poly(2,6-dimethoxy-1,4-phenylene ether),
poly(2,6-diethoxy-1,4-phenylene ether),
poly(2-methoxy-6-ethoxy-1,4-phenylene ether),
poly(2-ethyl-6-stearyloxy-1,4-phenylene ether),
poly(2-methyl-6-phenyl-1,4-phenylene ether),
poly(2-methyl-1,4-phenylene ether),
poly(2-ethoxy-1,4-phenylene ether),
poly(2-chloro-1,4-phenylene ether),
poly(3-methyl-6-t-butyl-1,4-phenylene ether),
poly(2,6-dichloro-1,4-phenylene ether),
poly(2,5-dibromo-1,4-phenylene ether),
poly(2,6-dibenzyl-1,4-phenylene ether), and various copolymers comprising plural kinds of the recurring units constituting the above-mentioned polymers. The copolymers include copolymers formed from 2,6-dimethylphenol and polysubstituted phenols such as 2,3,6-trimethylphenol, 2,3,5,6-tetramethylphenol and the like.

The term "polyphenylene ether resin" used in this invention involves graft-modified products prepared by grafting a styrene type monomer such as styrene, α-methylstyrene and the like onto said polyphenylene ether resins, too.

Among these polyphenylene ether resins, preferable ones are poly(2,6-dimethyl-1,4-phenylene ether) and 2,6-dimethylphenol/2,3,6-trimethylphenol copolymer.

Molecular weight of the polyphenylene ether resin usable in this invention cannot be simply defined because preferable range of molecular weight varies with purpose. Generally speaking, however, it is 0.1 to 0.7 dl/g and more preferably 0.2 to 0.6 dl/g, as expressed in terms of intrinsic viscosity measured in chloroform at 30° C.

The process for producing said polyphenylene ether resin is well known. It is disclosed in, for example, U.S. Pat. Nos. 3,306,874, 3,306,875, 3,257,357, JP-B-52-17880, JP-A-50-51197 and 1-304119, etc.

In this invention the term "polyarylene sulfide resin (B)" means a polymer constituted of recurring unit represented by the following general formula (2):

 (2)

wherein Ar is a divalent aromatic residue.

As examples of Ar, residues represented by the following structural formulas:

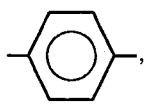

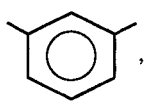

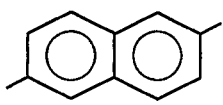

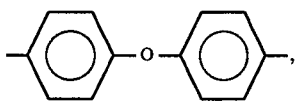

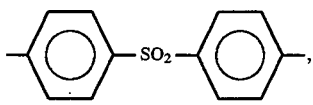

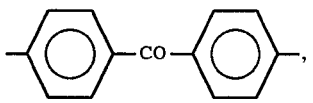

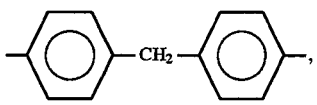

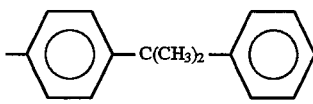

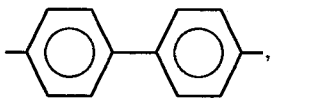

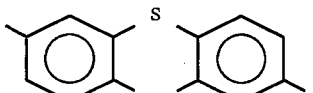

and nuclear substituted products thereof can be referred to. Polymers containing a small quantity of trifunctional group such as:

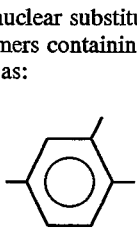

and the like in addition to these divalent aromatic residues are also included in the polyarylene sulfide resin of this invention.

As concrete examples of the polyarylene sulfide resin represented by general formula (2), the followings can be referred to:

polyphenylene sulfide,
poly(1,4-phenylenecarbonyl-1,4-phenylene sulfide),
poly(1,4-phenylenesulfonyl-1,4-phenylene sulfide),
poly(biphenylene sulfide), and the like. Among them, preferable polyarylene sulfides are those containing a unit of the following formula:

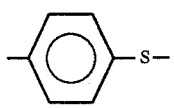

in an amount of 50 mole % or more, and more preferable polyarylene sulfide resin is polyphenylene sulfide.

Generally speaking, the polyarylene sulfide resins include linear type and crosslinked type. Both the types of polyarylene sulfide resins are usable in this invention, among which the linear type of ones are more preferable than the other type of ones.

Although molecular weight of the polyarylene sulfide resin is not critical, polyarylene sulfide resins having a molecular weight of 100 poises to 50,000 poises and preferably 200 poises to 10,000 poises, as expressed in terms of melt viscosity at 300° C., are usually used.

The process for producing such polyarylene sulfide resins is well known. As examples of the process, (i) a process which comprises reacting a dihalogeno-aromatic compound with an alkali sulfide in an organic polar solvent (cf. U.S. Pat. No. 2,513,188; U.S. Pat. No. 4,038,261; JP-B-44-27671; JP-B-45-3368; JP-A-55-43139; etc.), (ii) a condensation reaction of thiophenols in the presence of alkali catalyst, copper salt or the like (cf. U.S. Pat. No. 3,274,165), (iii) a process which comprises reacting an aromatic hydrocarbon with sulfur chloride in the presence of a Lewis acid (JP-B-46-27255), and the like can be referred to.

In this invention, the term "functional compound (C)" means an organic compound having a bond or a functional group selected from the group consisting of non-aromatic carbon-carbon multiple bond (carbon-carbon double or triple bond), oxirane group and derived-carboxyl group.

In this invention, functional compounds having only non-aromatic double or triple bond are the following olefins, liquid diene polymers and quinones.

Thus, concrete examples of such functional compound include olefins exemplified by dodecene-1, octadecene-1 and the like; liquid diene polymers exemplified by liquid polybutadiene; and quinones exemplified by 1,2- and 1,4-benzoquinones, 2,6-dimethylbenzoquinone, 2,6-diphenylbenzoquinone, tetramethylbenzoquinone, 2-chloro-1,4-benzoquinone, chloranil, 2,2'- and 4,4'-diphenoquinones, 1,2-, 1,4- and 2,6- naphthoquinones, 9,10-anthraquinone and the like.

In this invention, concrete examples of the functional compound having only oxirane group include epoxy compounds exemplified by epoxy resins produced by a condensation reaction of epichlorohydrin with a compound selected from the group consisting of polyvalent phenols, polyvalent alcohols and amines, epoxides of the above-mentioned liquid diene polymers, oxidized polyolefin waxes, octadecyl glycidyl ether, 1-hexadecene oxide and the like.

As examples of the functional compound of this invention having only a derived-carboxyl group, the following compounds can be referred to, wherein the term "derived-carboxyl group" inclusively means groups derived from carboxyl group as expressed by the following general formulas:

—COOR$_1$,
—COX,
—CONR$_2$R$_3$, or
—CO—Y—CO—, wherein R$_1$ represents hydrogen atom or C$_1$–C$_{20}$ alkyl or aryl group optionally having an inert substituent, X represents halogen atom, R$_2$ and R$_3$ each represents hydrogen atom or C$_1$–C$_{10}$ alkyl or aryl group optionally having an inert substituent, and Y represents oxygen atom or NH.

As concrete examples of such functional compound, carboxylic acid derivatives exemplified by maleic anhydride-containing polymers (styrene-maleic anhydride copolymer, polymaleic anhydride, and the like), succinic anhydride, methyl p-nitrobenzoate, p-cyanophenylacetamide and the like can be referred to.

As the functional compound (C) of this invention, functional compounds simultaneously having (i) at least one bond or functional group selected from the group consisting of non-aromatic carbon-carbon multiple bond, oxirane group and derived-carboxyl group and (ii) at least one functional group selected from the group consisting of derived-carboxyl group, derived-hydroxyl group, derived-amino group, derived-silyl group, derived-mercapto group, derived-sulfonic acid group and oxirane group, provided that the functional group of (ii) is different from the functional group of (i), are preferable.

As used herein, the term "derived-hydroxyl group" inclusively means groups derived from hydroxyl group and represented by the following general formulas:

—OR$_4$,
—OCOR$_5$, or
—OSi(R$_6$)$_3$, wherein R$_4$ and R$_5$ each represents hydrogen atom or C$_1$–C$_{10}$ alkyl or aryl group optionally having an inert substituent, and R$_6$, in a number of 3, each represents identical or different, C$_1$–C$_{10}$ alkyl, aryl or alkoxy group optionally having an inert substituent.

The term "derived-amino group" inclusively means groups derived from amino group and represented by general formula —NHR$_7$ or —NHCOR$_8$, wherein R$_7$ represents hydrogen atom, cyano group or C$_1$–C$_{10}$ alkyl or aryl group optionally having an inert substituent, and R$_8$ represents hydrogen atom or C$_1$–C$_{20}$ alkyl or aryl group optionally having an inert substituent.

The term "derived-silyl group" inclusively means groups derived from silyl group and represented by general formula —Si(R$_9$)$_3$, wherein R$_9$, in a number of 3, is identical or different from one another, each represents hydrogen atom or C$_1$–C$_{10}$ alkyl, aryl or alkoxy group optionally having an amino or mercapto substituent.

The term "derived-mercapto group" inclusively means groups derived from mercapto group and represented by general formula —SR$_{10}$ or —SCOR$_{11}$, wherein R$_{10}$ and R$_{11}$ each represents hydrogen atom or C$_1$–C$_{10}$ alkyl or aryl group optionally having an inert substituent.

The term "derived-sulfonic acid group" inclusively means groups derived from a sulfonic acid group and represented by general formula —SO$_3$R$_{12}$, —SO$_2$X or —SO$_2$NR$_{13}$R$_{14}$, wherein R$_{12}$ represents hydrogen atom or C$_1$–C$_{20}$ alkyl or aryl group optionally having an inert substituent, X represents halogen atom, and R$_{13}$ and R$_{14}$ each represents hydrogen atom or C$_1$–C$_{10}$ alkyl or aryl group optionally having an inert substituent.

Preferable examples of the functional compound include the followings: unsaturated dicarboxylic acids exemplified by maleic acid, fumaric acid, chloromaleic acid, Hymic acid, citraconic acid, acotinic acid, itaconic acid and the like; unsaturated monocarboxylic acids exemplified by acrylic acid, butanoic acid, crotonic acid, vinylacetic acid, methacrylic acid, pentenoic acid, dodecenoic acid, linoleic acid, angelic acid, cinnamic acid and the like; acid anhydrides of the above-mentioned α,β-unsaturated dicarboxylic acids or unsaturated monocarboxylic acids exemplified by maleic anhydride, Hymic anhydride, acotinic anhydride, itaconic anhydride, citraconic anhydride, acrylic anhydride and the like; acid amides of the above-mentioned α,β-unsaturated dicarboxylic acids or unsaturated mono-carboxylic acids exemplified by maleic acid amide, maleinhydrazide, acrylamide, N-(hydroxymethyl)-acryl-amide and the like; esters of the above-mentioned α,β-unsaturated dicarboxylic acids or unsaturated monocarboxylic acids exemplified by ethyl maleate and the like; imides of the above-mentioned α,β-unsaturated dicarboxylic acids or unsaturated monocarboxylic acids exemplified by maleimide and the like; unsaturated epoxy compounds exemplified by allyl glycidyl ether, glycidyl acrylate, glycidyl methacrylate and the like; unsaturated amines exemplified by allylamine, p-amino-styrene, N-vinylaniline and the like; unsaturated alcohols exemplified by allyl alcohol, 3-buten-2-ol, propargyl alcohol and the like; alkenylphenols exemplified by p-vinylphenol, 2-propenylphenol and the like; organosilane compounds exemplified by 2-(3-cyclohexenyl)-ethyltrimethoxysilane, 1,3-divinyltetraethoxysilane, vinyltris-(2-methoxyethoxy)-silane, 5-(bicycloheptenyl)-triethoxysilane, γ-aminopropyltriethoxysilane, γ-mercaptopropyltrimethoxysilane and the like; mercapto compounds exemplified by 3-mercaptopropionic acid, 2-mercaptobenzimidazole and the like; oxycarboxylic acid derivatives exemplified by 2-hydroxyisobutyric acid, citric acid, malic acid, agaricic acid, calcium citrate, calcium malate, potassium citrate, potassium malate, acetyl citrate, stearyl citrate, distearyl citrate, acetyl malate, stearyl malate, N,N'-diethylcitric acid amide, N,N'-dipropylcitric acid amide, N-phenylcitric acid amide, N-dodecylcitric acid amide, N,N'-didodecylcitric acid amide, N-dodecylmalic acid amide and the like; acid chlorides exemplified by trimellitic anhydride acid halides, chloroformylsuccinic acid, chloroformylsuccinic anhydride, chloroformylglutaric acid, chloroformylglutaric anhydride, chloroacetylsuccinic anhydride and the like.

More preferable functional compounds are compounds simultaneously having (i) a non-aromatic carbon-carbon multiple bond and (ii) at least one functional group selected from the group consisting of the above-mentioned derived-carboxyl group, derived-hydroxyl group, derived-amino group, derived-silyl group, derived-mercapto group and oxirane group, and the above-mentioned oxycarboxylic acid derivatives. Among them, further more preferable functional compounds are maleic acid, fumaric acid, itaconic acid, citraconic acid, acrylic acid, methacrylic acid, maleic anhydride, Himic anhydride, itaconic anhydride, citraconic anhydride, glycidyl methacrylate, glycidyl acrylate, acrylamide, maleimide, allylamine, diallylamine, allyl alcohol, propargyl alcohol, citric acid and malic acid; and most preferable functional compounds are maleic anhydride, itaconic anhydride, citraconic anhydride, fumaric acid, citric acid and malic acid.

In some cases, the functional compound (C) of this invention gives a better result when used in combination with an alkenyl-aromatic hydrocarbon such as styrene, α-methylstyrene and the like.

In this invention, the term "polar compound (D)" means a low molecular weight organic compound or high molecular weight organic compound having, in one molecule, two or more polar groups selected from the group consisting of derived-carboxyl group, derived-hydroxyl group, derived-amino group, derived-mercapto group, derived-sulfonic acid group, oxazoline group, cyanamide group, isocyanate group and oxirane group; provided that at least one of the polar groups must be different from at least one of the functional groups which the functional compound (C) has.

As concrete examples of said polar compound (D), the followings can be referred to: aromatic polycarboxylic acids such as terephthalic acid, isophthalic acid, phthalic acid, p-carboxyphenylacetic acid, p-phenylenediacetic acid, m-phenylenediacetic acid, m-phenylenediglycolic acid, diphenyldiacetic acid, diphenyl-p,p'-dicarboxylic acid, diphenyl-m,m'-dicarboxylic acid, diphenyl-4,4'-diacetic acid, diphenylmethane-p,p'-dicarboxylic acid, diphenylethane-p,p'-dicarboxylic acid, stilbenedicarboxylic acid, benzephenone-4,4'-dicarboxylic acid, naphtalene-1,4-dicarboxylic acid, naphthalene-1,5-dicarboxylic acid, naphthalene-2,6-dicarboxylic acid, p-carboxyphenoxyacetic acid, trimellitic acid, pyromellitic acid and the like; aliphatic polycarboxylic acids such as oxalic acid, succinic acid, adipic acid, cork acid, azelaic acid, sebacid acid, dodecanedicarboxylic acid, undecanedicarboxylic acid and the like; acid anhydrides of the above-mentioned aromatic and aliphatic polycarboxylic acids; polyhydric alcohols such as ethylene glycol, propylene glycol, trimethylene glycol, butane-1,4-diol, 2,2-dimethylpropane-1,3-diol, cis-2-butene-1,4-diol, trans-2-butene-1,4-diol, pentamethylene glycol, hexamethylene glycol, heptamethylene glycol, octamethylene glycol, decamethylene glycol, glycerol, trimethylolpropane, pentaerythritol, m-xylylenediol, p-xylylenediol and the like; polyhydric phenols such as hydroquinone, resorcin, catechol, 4,4'-dihydroxybiphenyl, 4,4'-dihydroxydiphenyl ether, Bisphenol A, Bisphenol S, Bisphenol F, pyrogallol, phloroglucin and the like; aliphatic polyamines such as ethylenediamine, propylenediamine, diaminobutane, diaminopentane, 2-methylpentamethylenediamine, hexamethylenediamine, 1,8-diaminooctane, 1,12-diaminododecane, N,N'-di(2-nitro-2,2-dimethylethyl)-hexamethylenediamine, p-xylylenediamine, m-xylylenediamine, tris(3-aminopropyl)amine and the like; aromatic polyamines such as p-phenylenediamine, m-phenylenediamine, tolylenediamine, 4,4'-diaminodiphenylmethane, 4,4'-diaminodiphenyl ether, 4,4'-diaminodiphenyl sulfide, 3,3'-diaminodiphenyl sulfone and the like; polycyanamides such as 4,4'-dicyanamidocyclohexylmethane, 4,4'-dicyanamidodiphenyl ether, 2,2'-bis[4-(4-cyanamidophenoxy)phenyl]-propane, hexamethylene dicyanamide, dodecamethylene dicyanamide and the like; bisoxazolines such as 2,2'-bis(2-oxazoline), 2,2'-p-phenylenebis(2-oxazoline), 2,2'-m-phenylenebis(2-oxazoline), 2,2'-o-phenylenebis(2-oxazoline), 2,2'-ethylenebis(2-oxazoline), 2,2'-tetramethylenebis(2-oxazoline) and the like; polyisocyanates such as 1,12-dodecane diisocyanate, hexamethylene diisocyanate, m-phenylene diisocyanate, 2,4-toluylene diisocyanate, 2,6-toluylene diisocyanate, 4,4'-diphenylmethane diisocyanate, 1,4-cyclohexane diisocyanate, 4,4'-dicyclohexylmethane diisocyanate, polymethylene-polyphenylene polyisocyanate and the like; polymercaptans such as ethanedithiol, 1,4-butanedithiol, trithioglycerine, dithiocatechol, dithioresorcin, dithioquinol, trithiophloroglucin and the like; polyepoxides such as Bisphenol A diglycidyl ether, diglycidyl terephthalate, triglycidyl isocyanurate and the like; etc.

The polar compounds (D) usable in this invention are not limited to the above-mentioned compounds, but compounds having two or more kinds of the above-mentioned polar groups in one molecule, such as aminocarboxylic acids (e.g. aminobenzoic acid, aminobenzoic esters and the like), hydroxycarboxylic acids (e.g. 12-hydroxydodecanoic acid and the like), mercaptocarboxylic acids, aminoalcohols (e.g. monoethanolamine, diethanolamine and the like), aminophenols (e.g. diethanolamine and the like), and reaction products formed from the above-mentioned polar compounds, are also usable as the polar compound of this invention.

Among these polar compounds, aliphatic polyamines and polyisocyanates are preferable. More preferable polar compounds are diamino compounds represented by the following general formula:

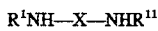

wherein $R_1$ and $R^{11}$ each represents hydrogen atom or alkyl group optionally having an inert substituent and X represents $C_7$–$C_{30}$ alkylene group optionally having an inert substituent, mixtures of said diamino compounds, polyisocyanates represented by the following general formula [I]:

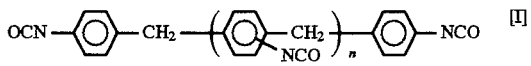

wherein n represents 0 or an integer not smaller than 1, and mixtures of said polyisocyanates. More preferable polar compounds are 1,12-diaminododecane, diphenylmethane diisocyanate and polymethylene-polyphenylene polyisocyanate. As referred to herein, polymethylene-polyphenylene polyisocyanate means a mixture of plural polyisocyanates represented by general formula [I] different in the value of n from one another. A variety of such mixtures different in formulation are available commercially.

In the resin composition of this invention, the amounts of polyphenylene ether resin (A), polyarylene sulfide resin (B), functional compound (C) and polar compound (D) are not critical, but they can arbitrarily be selected in accordance with the object, namely heat resistance, fluidity, etc. required of the composition. Generally speaking, a proportion of polyphenylene ether resin (A) and polyarylene sulfide resin (B) is in the range of 1:99 to 99:1 and preferably 5:95 to 95:5, as expressed in terms of % by weight based on the sum of polyphenylene ether resin (A) and polyarylene sulfide resin (B).

As for functional compound (C) and polar compound (D) in the resin composition of this invention, their effects vary with the kinds of themselves and kinds or compositions of selected polyphenylene ether resin (A) and polyarylene sulfide resin (B). Accordingly, preferable ranges of proportions of (C) and (D) cannot be decided simply. Usually, however, the proportions of functional compound (C) is 0.1 to 30 parts by weight and preferably 0.2 to 20 parts by weight and the proportion of polar compound (D) is 0.01 to 20 parts by weight and preferably 0.02 to 10 parts by weight, per 100 parts by weight of the sum of polyphenylene ether resin (A) and polyarylene sulfide resin (B), respectively.

The resin composition of this invention can be obtained only by incorporating polar compound (D) after melting and kneading ingredients (A), (B) and (C). More concretely speaking, ingredient (D) must be incorporated after ingredients (A), (B) and (C) have formed a uniform melted mixture at least apparently. If a part of each ingredient (A), (B) and (C) is mixed into composition after or simultaneously with incorporation of ingredient (D), it makes no trouble at all so far as such a partial mixing of (A), (B) and (C) does not deteriorate the effect of this invention.

As the method for melting and kneading ingredients (A), (B) and (C), a variety of hitherto known methods can be adopted. Thus, these ingredients are mixed together by a hitherto known mixing means for mixing a resin with other resin or a resin with a liquid or solid additive such as Henschel mixer, Supermixer, ribbon blender, V blender and the like to form a uniform mixture and then the mixture is kneaded by the use of a kneading apparatus such as Banbury mixer, Plastomill, Brabender plastograph, single screw extruder, twin screw extruder and the like, for example.

In carrying out the kneading, the temperature is selected from the range of 150° to 400° C., preferably 200° to 350° C. It is sometimes preferable to carry out the kneading in the presence of a radical generator in order to obtain a more uniform resin composition.

Examples of said radical generator include halogenated imides such as N-bromosuccinimide and the like; organic peroxides such as benzoyl peroxide, dicumyl peroxide, di-t-butyl peroxide, cumene hydroperoxide, 2,5-dimethyl-2, 5-di(peroxybenzoato)-hexine-3, 1,3-bis(t-butylperoxyisopropyl)-benzene, lauroyl peroxide, t-butyl peracetate and the like; persulfates such as potassium persulfate, ammonium persulfate and the like; diazo compounds such as azobisisobutyronitrile, 1,1'-azobis (cyclohexanecarbonitrile) and the like.

When such a radical generator is used, its amount is usually 10 parts by weight or less and preferably 0.001 to 5 parts by weight, per 100 parts by weight of the sum of polyphenylene ether resin (A) and polyarylene sulfide resin (B).

Polar compound (D) may be mixed into the mixture obtained above at any time, so far as it is added after (A), (B) and (C) have formed a uniform melted mixture at least apparently. As the method for the mixing in this step, the above-mentioned method of melting and kneading is preferable, though it is not limitative.

As concrete examples of the preferred embodiment of the process for producing the resin composition of this invention, an embodiment which comprises melting and kneading ingredients (A), (B) and (C) optionally in the presence of a radical generator, once isolating the kneaded mixture as a formed product such as pellet, and then melting and kneading the formed product together with ingredient (D) and optionally together with a part of ingredients (A) and (B), an embodiment which comprises continuously feeding ingredients (A), (B), (C) and optionally a radical generator into an extruder from a feeding hole provided in the upstream side of the extruder, and ingredient (D) and optionally a part of ingredients (A) or (B) from a feeding hole provided in the downstream side of the extruder both at predetermined rates, and extruding the resulting mixture while melting and kneading it, and the like can be referred to.

In mixing ingredient (D), a tertiary amine, a quaternary ammonium salt, a phosphine, an imidazole and the like may be added as a catalyst for accelerating the reaction of the ingredients without any restriction.

If desired, the resin composition of this invention can contain a wide variety of substances other than the above. Examples of said other substance include other resins, elastomers, flame retardants, stabilizers, plasticizers, lubricants, pigments, reinforcing fibers, fillers and the like.

Examples of said "other resin" which can be incorporated into the resin composition of this invention include polyamides such as nylon-6, nylon-66, nylon-12 and the like; polyamide-imides; polyacrylic esters such as polymethyl methacrylate and the like; polyvinyl halides such as polyvinyl chloride, polyvinylidene chloride and the like; polystyrenes such as polystyrene, ABS and the like; polyolefins such as polyethylene, polypropylene and the like; polyesters such as PET, PBT, polyarylate and the like; polycarbonates; polysulfones; polyketones; and the like.

Examples of said elastomer include natural rubber, polybutadiene rubber, polyisoprene rubber, butyl rubber, ethylene-propylene copolymer rubbers (EPM, EPDM), butadienestyrene copolymer rubber, butadiene-acrylonitrile copolymer rubber, hydrogenated and non-hydrogenated styrene-conjugated diene type block copolymer rubbers, polyester rubber, acryl rubber, silicone rubber and the like, and modified products thereof.

Among these elastomers, preferable elastomers are EPDM, graft-copolymerized EPM and EPDM prepared by graft-copolymerized them with an unsaturated monomer such as styrene and the like, and styrene-conjugated diene type block copolymer rubbers such as styrene-isoprene diblock copolymer, styrene-butadiene triblock copolymer and the like including their hydrogenated products such as partially hydrogenated product and the like.

Examples of said flame retardant include phosphoric esters such as triphenyl phosphate, tricresyl phosphate, phosphates obtained from a mixture of isopropylphenol and phenol, phosphates obtained from a mixture consisting of a bifunctional phenol such as hydroquinone or Bisphenol A and other alcohol or phenol, and the like; brominated compounds such as decabromobiphenyl, pentabromotoluene, decabromodiphenyl ether, hexabromobenzene, brominated polystyrene, brominated epoxy resin and the like; nitrogen-containing compounds such as melamine, melamine triisocyanurate and the like; and inorganic substances such as red phosphorus, antimony trioxide, boron oxide and the like.

Concrete examples of said reinforcing fiber include inorganic fibers such as glass fiber, potassium titanate fiber, rock wool, carbon fiber and the like; organic fibers such as aromatic polyamide fiber, polybenzimidazole fiber and the like; and metallic fibers such as brass fiber, aluminum-zinc fiber and the like.

Concrete examples of said filler include inorganic fillers such as glass beads, milled glass fiber, asbestos, wallastonite, mica, talc, clay, calcium carbonate, magnesium hydroxide, silica, diatomaceous earth and the like; metallic fillers such as aluminum flake, zinc flake and the like; and organic fillers such as polyimide powder and the like.

Concrete examples of said stabilizer include sterically hindered phenols, organic phosphites, oxalic acid diazides, sterically hindered amines and the like. Concrete examples of said pigment include titanium oxide, zinc sulfide and the like. Concrete examples of said lubricant include polyethylene wax, paraffin and the like.

The amounts of the above-mentioned "other substances" to be incorporated into the resin composition can be arbitrarily selected in accordance with purpose. As a general standard of the amounts, said "other resin" and elastomer are used each in an amount of 100 parts by weight or less, the flame retardant is used in an amount of 30 parts by weight or less and preferably 1 to 20 parts by weight, said stabilizer is used in an amount of 20 parts by weight or less and preferably 0.001 to 10 parts by weight, said reinforcing fiber and filler are used each in an amount of 150 parts by weight or less and preferably 0.1 to 100 parts by weight, and said lubricant is used in an amount of 2 parts by weight or less, all per 100 parts by weight of the sum of polyphenylene ether resin (A) and polyarylene sulfide resin (B).

Next, this invention is illustrated in more detail with reference to the following examples. This invention is by no means limited by the examples.

In the examples, Izod impact strength (3.2 mm in thickness, unnotched) and heat distortion temperature (HDT: at 4.6 kg/cm$^2$) were measured on pieces prepared by injection molding according to ASTM D256 (at 23° C.) and ASTM D648, respectively.

Referential Example 1

Fifty parts by weight of poly(2,6-dimethyl-1,4-phenylene ether) [PPE H-46, manufactured by Nippon Polyether Co.], 50 parts by weight of crosslinked polyphenylene sulfide having a melt viscosity of 2,000 poises at 300° C., 3 parts by weight of maleic anhydride, 2 parts by weight of styrene and 1 part by weight of a radical generator composition prepared by dispersing 1,3-bis(t-butylperoxyisopropyl)-benzene into polypropylene up to a concentration of 8% by weight were mixed together with Supermixer, and the resulting mixture was melted and kneaded with a twin screw kneading extruder [TEM-50, manufactured by Toshiba Kikai K.K.] at a barrel temperature of 320° C. while venting just before the die head. The extruded strand was pelletized to obtain a pellet of preliminary kneaded mixture. It was named A-1.

Referential Example 2

Melting and kneading were carried out in the same manner as in Referential Example 1, except that the crosslinked polyphenylene sulfide was replaced with a straight chain type polyphenylene sulfide having a melt viscosity of 4,800 poises at 300° C., to obtain a pellet of preliminary kneaded mixture. It was named A-2.

Referential Example 3

Melting and kneading were carried out in the same manner as in Referential Example 1, except that no polyphenylene sulfide was used and the poly(2,6-dimethyl-1,4-phenylene ether) was used in an amount of 100 parts by weight in place of the 50 parts by weight in Referential Example 1. Thus, a pellet of preliminary kneaded mixture was obtained. It was named A-3.

Referential Example 4

Melting and kneading were carried out in the same manner as in Referential Example 1, except that no poly(2,6-dimethyl-1,4-phenylene ether) was used and the polyphenylene sulfide was used in an amount of 100 parts by weight in place of the 50 parts by weight in Referential Example 1. Thus, a pellet of preliminary kneaded mixture was obtained. It was named A-4.

Example 1

One hundred parts by weight of the preliminary kneaded mixture (A-1) obtained in Referential Example 1 and 1 part by weight of 1,12-diaminododecane as a polar compound were mixed together, and the mixture thus obtained was melted and kneaded by means of the same twin screw kneading extruder as used in Referential Example 1 at a temperature of 320° C. Thus, a resin composition of this invention was obtained. Izod impact strength of the resin composition is shown in Table 1.

Injection molded product of the resin composition had a good appearance, showing no ply separation, and its HDT was as high as 207° C.

Examples 2–9 and Comparative Examples 1–2

Resin compositions were prepared by repeating the melting and kneading of Example 1, except that the preliminary kneaded mixture and polar compound were altered to those shown in Table 1 to Table 2. Izod impact strengths of the resin compositions thus obtained are shown in Table 1 and Table 2.

TABLE 1

| No. | Preliminary kneaded mixture-I (parts by wt.) | Preliminary kneaded mixture-II (parts by wt.) | Polyfunctional compound (parts by wt.) | Izod impact strength (kg · cm/cm) |
|---|---|---|---|---|
| Example 1 | A-1 (100) | — | 1,12-Diamino-dodecane (2) | 30 |
| Example 2 | A-2 (100) | — | 1,12-Diamino-dodecane (2) | 42 |
| Example 3 | A-1 (100) | — | 1,8-Diamino-octane (2) | 25 |
| Example 4 | A-1 (100) | — | 4,4'-Diphenylmethane diisocyanate (2) | 15 |
| Example 5 | A-1 (100) | — | Hexamethylene diisocyanate cresol adduct (2) | 14 |
| Example 6 | A-1 (100) | — | Diamine S* | 20 |

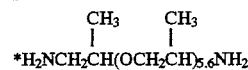

*$H_2NCH_2CH(CH_3)(OCH_2CH(CH_3))_{5-6}NH_2$

TABLE 2

| No. | Preliminary kneaded mixture-I (parts by wt.) | Preliminary kneaded mixture-II (parts by wt.) | Polyfunctional compound (parts by wt.) | Izod impact strength (kg · cm/cm) |
|---|---|---|---|---|
| Example 7 | A-1 (100) | — | Hexamethylenediamine (2) | 15 |
| Example 8 | A-1 (100) | — | 2-Amino-1-butanol (2) | 13 |
| Example 9 | A-1 (100) | — | Resorcin diglycidyl ether (2) | 10 |
| Comparative Example 1 | A-1 (100) | — | — | 3.2 |
| Comparative Example 2 | A-3 (50) | A-4 (50) | 2-Amino-1-butanol (2) | 6.5 |

What is claimed is:

1. A resin composition prepared by simultaneously melting and kneading (A) a polyphenylene ether resin having an intrinsic viscosity of 0.2 to 0.6 dl/g as expressed in terms of intrinsic viscosity measured in chloroform at 30° C., (B) a polyphenylene sulfide resin having melt viscosity of 200 to 10,000 poises at 300° C. and (C) a functional compound selected from the group consisting of maleic anhydride, itaconic anhydride, citraconic anhydride, and fumaric acid, and subsequently mixing thereinto (D) a polar compound having, in one molecule, at least two polar groups selected from the group consisting of 1,12-diaminododecane, 1,8-diaminooctane, hexamethylenediamine, 2-amino-1-butanol and a diamine compound shown by the formula (1):

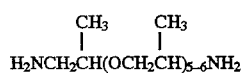

$$H_2NCH_2CH(CH_3)(OCH_2CH(CH_3))_{5-6}NH_2 \quad (1)$$

wherein the proportion of the polyphenylene ether resin (A) and the polyphenylene sulfide resin (B) is 5:95 to 95:5 as expressed in terms of % by weight based on the sum of the polyphenylene ether resin (A) and the polyphenylene sulfide resin (B), and the proportions of the functional compound (C) and the polar compound (D) are 0.2 to 20 parts by weight and 0.02 to 10 parts by weight per 100 parts by weight of the sum of the polyphenylene ether resin (A) and the polyphenylene sulfide resin (B).

2. A resin composition according to claim 1, wherein the polyphenylene ether resin composition (A) is poly(2,6-dimethyl-1,4-phenylene ether) or 2,6-dimethylphenol/2,3,6-trimethylphenol copolymer.

* * * * *